US011862849B2

(12) United States Patent
Reidy et al.

(10) Patent No.: US 11,862,849 B2
(45) Date of Patent: *Jan. 2, 2024

(54) RADOME WITH APERTURE AND METHOD MAKING SAME

(71) Applicant: JABIL INC., St. Petersburg, FL (US)

(72) Inventors: Tom Reidy, Tampa, FL (US); Haijian Ni, St. Petersburg, FL (US); Ian Jeffery Timmins, Seminole, FL (US); Babak Zarrin Rafie, Ottawa (CA)

(73) Assignee: JABIL INC., St. Petersburg, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,457

(22) Filed: Aug. 12, 2022

(65) Prior Publication Data

US 2022/0393344 A1 Dec. 8, 2022

Related U.S. Application Data

(63) Continuation of application No. 17/171,596, filed on Feb. 9, 2021, now Pat. No. 11,476,568.

(51) Int. Cl.
*H01Q 1/42* (2006.01)

(52) U.S. Cl.
CPC .................................... *H01Q 1/42* (2013.01)

(58) Field of Classification Search
CPC ........................................................ H01Q 1/42
USPC .......................................................... 343/872
See application file for complete search history.

(56) References Cited

U.S. PATENT DOCUMENTS

| | | | | |
|---|---|---|---|---|
| 4,937,587 | A | 6/1990 | Tsuda | |
| 10,224,624 | B2 | 3/2019 | Nair et al. | |
| 2017/0187100 | A1 | 6/2017 | Fotheringham et al. | |
| 2018/0198197 | A1* | 7/2018 | Toyao | H01Q 21/24 |
| 2018/0351243 | A1* | 12/2018 | Lewis | H01Q 1/282 |
| 2020/0044326 | A1 | 2/2020 | Olfert et al. | |
| 2020/0044328 | A1 | 2/2020 | Puzella et al. | |
| 2021/0249771 | A1 | 8/2021 | Schuss et al. | |

FOREIGN PATENT DOCUMENTS

| | | | |
|---|---|---|---|
| JP | HP05327344 | * 12/1993 | H01Q 15/24 |
| WO | 2012031427 | * 2/2012 | C08J 7/04 |

* cited by examiner

*Primary Examiner* — Peguy Jean Pierre
(74) *Attorney, Agent, or Firm* — Shumaker, Loop & Kendrick, LLP; James D. Miller

(57) ABSTRACT

A radome and a method for manufacturing same. A radome apparatus has a radome body having an aperture, a film covering the aperture, and a support installed into the aperture. The film and the support have a low loss at a desired operating frequency. The support provides backing, support, and rigidity for the film so that distortion of the film by weather conditions, such as wind, is reduced. Thus, the integrity of the RF transmission characteristics of the radome are preserved. The aperture, film, and support are in the boresight of an antenna and are large enough to accommodate a desired beam steering range. The radome body may be manufactured with the aperture and the film included therein by using an in-mold labeling process. The support may be installed in the aperture by a subsequent molding process.

19 Claims, 5 Drawing Sheets

RADOME WITH APERTURE AND METHOD MAKING SAME

CROSS REFERENCE TO RELATED APPLICATIONS

This application is a continuation patent application of U.S. patent application Ser. No. 17/171,596 filed on Feb. 9, 2021, the entire contents of which are incorporated herein by reference.

FIELD OF THE INVENTION

This disclosure generally relates to radomes, millimeter-wave (mmW) radomes, and mmW radomes useful in adverse weather conditions.

BACKGROUND OF THE INVENTION

Radomes are useful to protect electronic systems, such as radio frequency (RF) transmitters and/or receivers, from adverse weather conditions, such as rain, snow, fog, and the like. It may be preferable for a radome to be physically thin, as RF signal transparency and/or weight reduction is desired among other design requirements. A thin radome may, however, be susceptible to physical distortion, such as from gravity, wind loading or ice. This distortion, such as along a boresight of a protected antenna, may significantly change the RF transmission characteristics of the radome and, therefore, the antenna transmission/reception pattern, thus adversely affecting communication system performance.

BRIEF DESCRIPTION OF THE DRAWINGS

In the non-limiting embodiments discussed herein, like numerals indicate like elements throughout the several Figures of the Drawing, wherein.

DETAILED DESCRIPTION

Certain embodiments relate to a mmW radome that may exhibit enhanced performance, especially under adverse weather conditions, such as wind. The radome may protect a beam-forming antenna system having at least one operating frequency (e.g., including at least one antenna having at least one operating frequency) and associated electronics from the weather conditions. In certain embodiments, a mmW radome may have a body, an aperture in the body, a film covering the aperture, and a support at least partially in the aperture. The film and the support are made from materials which have a low loss at the desired frequency of operation, e.g., at a first frequency of the at least one operating frequency and/or at more than one of the at least one operating frequency.

According to certain embodiments, the aperture may be positioned at or near a boresight of the beam-forming antenna system. The film may be thin and backed by the support, to mitigate distortion of the film, such as deflection from wind loading, and therefore mitigate impact upon the transmission characteristics of the radome and, therefore, upon the beam formed by the antenna. The radome may therefore be thin and light and provide improved RF transmission characteristics as compared to a thick radome, and be more resistant to adverse effects from weather conditions and provide improved RF transmission characteristics as compared to a thick radome.

Certain embodiments relate to a method of making a mmW radome. Certain embodiments include molding a radome body with an aperture and a film included therein. In certain embodiments a support may be installed at least partially into the aperture as part of a subsequent molding process.

According to an embodiment, a mmW radome has a body, an aperture in the body, a film covering the aperture, and a support installed into the aperture. Such a radome may protect one or more beam-forming antennae and associated electronics from weather conditions. The film and the support may be made from materials which have a low transmission loss at a desired frequency of operation of a protected beam-forming antenna. The support may provide backing, support, and rigidity for the film, so that distortion of the film by weather conditions, such as wind, is reduced. Thus, the integrity of the beam formed by the antenna may be preserved.

Figure 1:
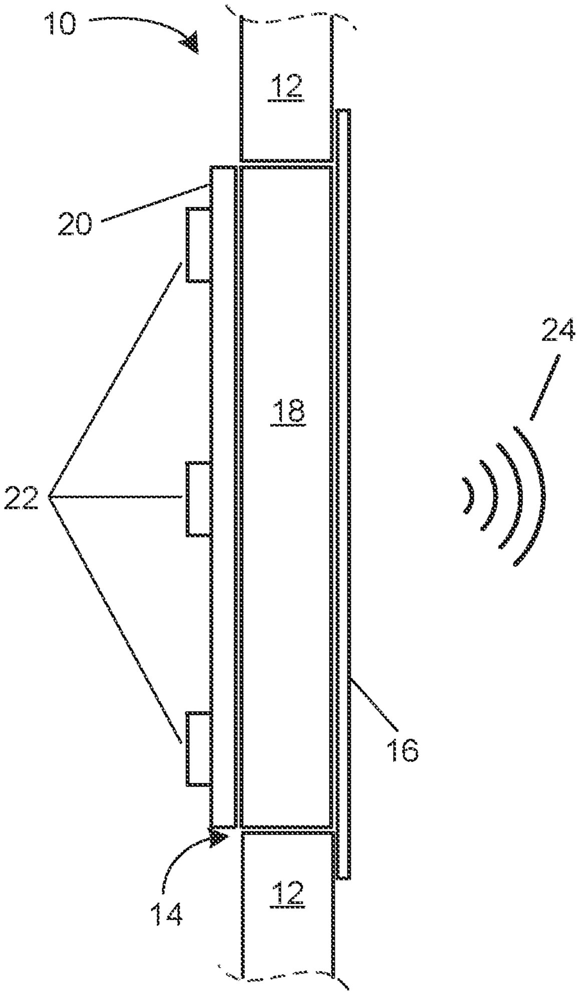
FIG. 1 is an illustration of an embodiment of an enhanced performance mmW radome in an exemplary environment.

FIG. 1 is an illustration of radome 10 according to an embodiment. Radome 10 includes radome body 12 (often referred to herein as "body 12"), such as conventional radome structure, aperture 14 in body 12, film 16 covering aperture 14, and support 18 at least partially in aperture 14. Film 16 and support 18 may be made from materials which have a low loss at a desired frequency of operation of an associated antenna structure, such as phased array circuit board 20, which includes a plurality of beamforming Application Specific Integrated Circuits (ASICs) 22. ASICs 22 may transmit and/or receive RF signals at the desired operating frequency or frequencies and phase), shown as RF signal 24.

According to an embodiment, phased array circuit board 20 can steer the antenna pattern from boresight to provide a desired coverage area (the "beam steering range") in a conventional manner. According to an embodiment aperture 14 may be large enough to accommodate the beam steering range of board 20.

Figure 2:
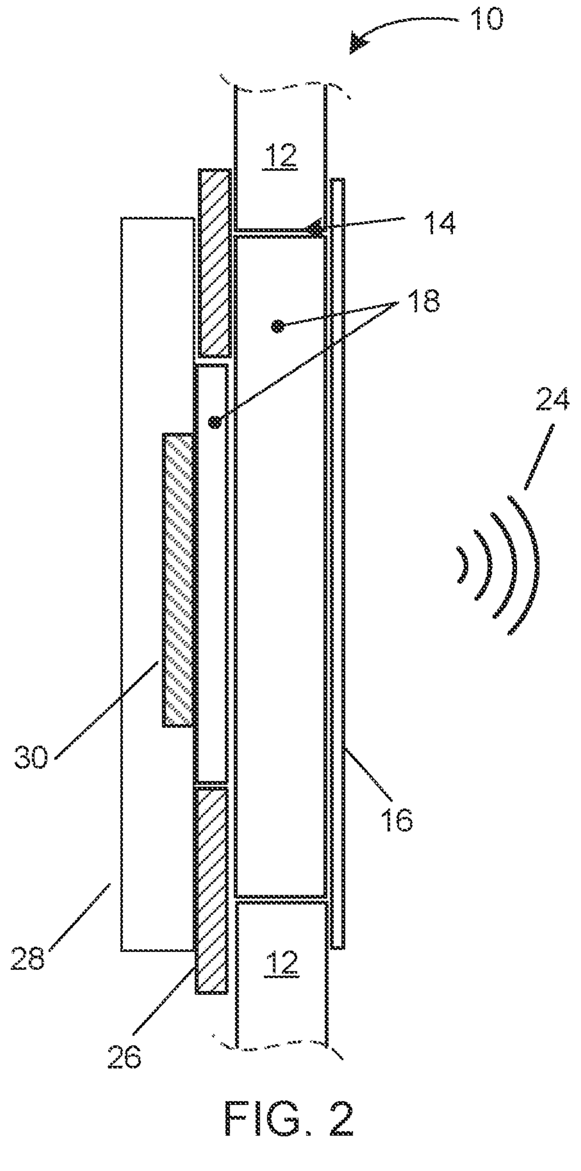
FIG. 2 is an illustration of an embodiment of an enhanced performance mmW radome in an exemplary environment.

FIG. 2 is an illustration of radome 10 according to an embodiment. Again, radome 10 includes body 12, aperture 14 in body 12, film 16 covering aperture 14, and support 18. Also shown are Phased Array Antenna Module (PAAM) frame 26, PAAM printed circuit board 28, and PAAM antenna cavity 30 for board 28. In the embodiment of FIG. 2, two supports 18 are shown, but a single support or other number of supports may be used. The shading of components 26 and 30 is for clarity of illustration. According to an embodiment, PAAM printed circuit board 28 can steer a corresponding antenna pattern from boresight to provide a desired coverage area. According to an embodiment, aperture 14 and PAAM antenna cavity 30 may be large enough to accommodate PAAM 28 beam steering range.

Gaps (not numbered) are shown between the various components shown in FIGS. 1 and 2. Although these gaps may provide clarity of illustration, in certain embodiments there may be no gaps between ones of the various components, or gaps may be present between ones of the various components. For example, there may be no intentional gap between film 16 and foam support 18 in certain embodiments.

Further, “low loss”, as used herein means that attenuation of an RF signal at a desired operating frequency by a component does not unacceptably impair the operation of a system transmitting and/or receiving at that desired operating frequency. The degree of attenuation which is acceptable may be based on, for example, the transmitter power, the received signal strength, the sensitivity of the receiver, the amount of heating which the component can tolerate due to absorption of the transmitted signal, atmospheric attenuation, and/or the desired operating range (distance) of the system. A component may exhibit low loss as a result of, for example, its dielectric constant, or its thickness.

Referring to FIGS. 1 and 2, body 12 may take the form of a conventional radome and be made of, for example, a conventional radome material which has a low loss at the desired antenna operating frequency, and which is mechanically robust enough to survive the conditions of the area where radome 10 is to be used, such as wind, rain, snow, ice, and sun.

For example, radome body 12 may be injection molded with a PC/ABS resin, such as, Makrolon 6020, available from Covestro LLC (Baytown, Texas), or SABIC EXL9134, available from Tekra, LLC. (New Berlin, Wisconsin).

According to certain embodiments, body 12 may be thin, taking into consideration its size and the conditions that it may endure. For example, body 12 may have a thickness of approximately ½ wavelength at the operating frequency, giving due consideration to the dielectric constant of body 12.

While radome body 12 may be sufficiently thick to have sufficient structural integrity to mitigate physical distortion, such as would otherwise occur from, for example, weather conditions. Film 16, which covers aperture 14, and support 18, which is at least partially within aperture 14, are supported by radome body 12, such that structural requirements for these components may be reduced. This may allow for use of materials selected to reduce transmission loss and distortion of RF signal 24 as compared to radome body 12.

According to certain embodiments, overall radome design may thus be less sensitive to the actual dimensions of the antenna structure, as compared to a monolithic radome. Aperture 14, film 16, and support 18, can be tailored to a desired operating frequency and beam steering range. Materials used for a conventional radome that provide for low loss may not provide structural stability, whereas materials that provide adequate structural stability may not provide for low loss. In contrast, however, in radome 10 described herein, film 16 and support 18 can be made from materials that reduce transmission loss and distortion of RF signal 24, and radome body 12 can be made from materials that provide structural stability, thus providing a physically robust radome 10 which provides low loss RF signal transmission. Thus, radomes according to certain embodiments may be suitable for use across a wider range of frequencies, with less attenuation and distortion of RF signal 24, than a conventional monolithic-structure radome design. In an embodiment, film 16 may be thin, and support 18 may take the form of a foam, so the combined film 16 and support 18 have a low combined dielectric constant.

Aperture 14 may be sized based at least partially upon the frequency of operation and the desired steering range. For example, for a desired operating frequency of 28.5 GHz, and a beam steering range of ±60 degrees, aperture 14 may be about 101.479 mm high by 124.272 mm wide. The size of aperture 14 may at least partially depend upon the desired beam steering range and the distance between the front of aperture 14 (i.e., film 16) and ASICs 22.

Film 16 may be composed of a material having a low loss at the desired communications operating frequency, which can be applied to body 12 in a label-type form, and which can withstand the environmental conditions that it should endure. The thickness of film 16 may be selected in view of the environmental conditions and the expected or specified operational duration of film 16 or radome 10. Film 16 should be thick enough to securely bond to radome body 12 and to support 18, and thick enough to resist wind and other environmental conditions. The lower the dielectric constant of film 16, and/or the thinner film 16 is, the better it may operate. The thickness of film 16 may be selected, at least in part, upon the desired frequency of operation, such as by being less than a small fraction of a wavelength at the frequency of operation, when the dielectric constant of film 16 is considered. For example, assuming an operating frequency of approximately 28.5 GHz, film 16 may have a thickness of about 100 μm to about 250 Film 16 is thin so, for a large range of dielectric constants, any distortion of the film, and/or any deflection of position of the film, such as by wind, will have minimal effect on the RF performance of radome 10.

The degree to which film 16 overlaps body 12 may be selected based upon, at least in part, structural, environmental and materials used for body 12 and film 16 considerations, as well as the process of application of film 16 to body 12. A very windy environment where rain or drizzle can freeze may require more overlap than a calm, moderate, drier environment.

In an embodiment, film 16 may overlap body 12 by approximately 0.25 inches. In-mold labeling of film 16 to body 12 may, however, utilize less bonding area than adhesive bonding of film 16 to body 12. According to an embodiment, an adhesive applied to at least a portion of a periphery of film 16 and/or around aperture 14 may adhere film 16 to body 12. The materials selected for film 16 and body 12 should be structurally matched; e.g., both should be suitable for use with the desired manufacture method, such as in-mold labeling or by using a selected adhesive.

Support 18 may be composed of a material that provides for low signal loss at the desired operating frequency and which, when at least partially retained in aperture 14, provides support, or backing, for film 16, such that distortion (e.g., deflection) of film 16 is minimized under expected or specified environmental operating conditions. The thickness of support 18 may be selected at least partially based upon the desired frequency of operation, such as an integer multiple of a half-wavelength at the frequency of operation when the dielectric constant of support 18 is considered. According to certain embodiments, film 16 and support 18 may have a combined thickness, and aperture 14 may have a size, such that radome 10 provides the desired beam steering range while minimizing signal distortion and loss. In an exemplary environment, operating conditions for radome 10 are: wind speeds up to 120 miles per hour, with debris impact; temperatures from −40 degrees C. to +100 degrees C.; rainfall of 60 inches/year; and 8,000 hours of sunlight exposure, including exposure to ultraviolet light. In an embodiment, the strain in film 16 due to environmental operating conditions is less than 90% of the proportional strain limit as determined by film tensile testing and published by the film manufacturer.

According to certain embodiments, support 18 may extend beyond the front of body 12. According to certain embodiments, support 18 may extend beyond the rear of body 12. According to certain embodiments, support 18 may extend both beyond the front of body 12 and the rear of body 12. Support 18 is contained within radome 10, so it is not exposed to moisture (e.g., rain or snow) and this allows for a wider range of materials that may be used for support 18. Support 18 may be composed of a material which is not degraded by the expected environmental temperature range, operating frequency, or transmitter power levels. Such a support may be composed of a material that does not attract or retain moisture. Such a support has a thickness of about 2 mm to about 3 mm and takes the form of a low density rigid polyurethane foam. Such a foam may provide a low density with good structural performance and bond well to film 16 during molding (discussed below). Also, although a thinner, lower profile support may provide better RF transmission characteristics than a thicker support, in certain embodiments the support may be sufficiently thick to maintain film 16 at a desired distance from ASICs 22, so that any deflection of film 16 does not cause detuning of ASICs 22. Such a distance may be, for example, about ½ wavelength at the operating frequency of interest. According to certain embodiments, for an operating frequency of about 28 GHz, ½ wavelength is approximately 5.35 mm.

According to an embodiment radome 10 may be suitable for use on a communications tower, where it may experience a number of varying weather conditions. The frequency of operation, e.g., the desired frequency, may be, for example, between about 6 GHz and about 100 GHz. For example, the desired frequency may be suitable for cellular telephone 5G band communications. For example, such a radome may be useful for communications at or around a desired operating frequency of 28.5 GHz. Also, for example, such a radome may be useful for communications in the 3rd Generation Partnership Project (3GPP) New Radio (NR) Frequency Range 2 (FR2) bands, such as, for example, bands N257-261, which have respective frequency ranges of: 26,500 MHz-29,500 MHz; 24,250 MHz-27,500 MHz; 39,500 MHz-43,500 MHz; 37,000 MHz-40,000 MHz; and 27,500 MHz-28,350 MHz.

According to an embodiment, such radome 10 may have radome body 12 in the form of a flat plate, and dimensions of approximately 120 mm by 145 mm. The dimensions may depend, at least in part, upon the particular environment, such as the number of communication cells in an area, and the number of communication devices on a communication tower.

Signal transmission is a function of at least the material of radome body 12, the thickness of the material, the design (flat, tapered, convex, etc.) of radome body 12, and the frequency of operation. For a given material, determining the thickness to achieve maximum transmission at a given directional angle and a given frequency is fairly straightforward. Achieving maximum transmission over a wider range of angles and over a wider range of frequencies, however, generally requires a compromise as one thickness and/or dielectric constant may optimize transmission for a given directional angle and frequency but at the expense of transmission for another directional angle and/or frequency. For example, for a phased array antenna system, in the 28 GHz frequency band, with a flat plate design, a thickness of 3.2 mm with a given dielectric constant may optimize transmission at 0 degrees directional angle, but a thickness of 3.7 mm may optimize transmission at ±60 degrees directional angle. Therefore, according to a certain embodiment, the radome material has a thickness of 3.5 mm. Also, when giving consideration to the operating frequency, the range of directional angles, and acceptable losses, the dielectric constant and/or thickness of radome body 12 may be determined mathematically and/or empirically. According to a certain embodiment, radome body 12 is injection molded and is a thermoplastic polycarbonate with a dielectric constant above 2.7 and a thickness of 2 to 3 mm.

According to an embodiment, such radome 10 may include film 16. Such a film may have dimensions of about 114.179 mm by about 136.972 mm. Such a film may take the form of a polycarbonate film which is about 100 μm to about 250 μm thick. Such a film may be selected to withstand typical or projected weather conditions. Such a film may be selected to withstand typical or projected weather conditions for at least seven years. According to an embodiment film 16 may take the form of a commercially available film. An example of a commercially available film product for in-mold labeling is SABIC Lexan HP92 W, HP12 W Tekra film, available from Tekra, LLC (New Berlin, Wisconsin). An example of a commercially available film product for adhesive bonding is 3M 7735, available from Tekra, LLC, and from the 3M Company (St. Paul, Minnesota). The dielectric constant of a polycarbonate film is typically in the range of 2.4 to 3.3. The dielectric constant of film 16 may not significantly affect system performance if the thickness of film 16 is less than about 500 μm.

According to a certain embodiment, film 16 may be integrally molded to body 12 by fusing film 16 to body 12, such as by using in-mold labeling to apply film 16 to body 12.

According to an embodiment, such radome 10 may have support 18 having dimensions suitable for use with an aperture about 101.479 mm high by about 124.272 mm wide (assuming a beam steering range of about ±60 degrees). In an embodiment, such support 18 may take the form of a foam having a dielectric constant between about 1.05 and about 1.25. In certain embodiments, support 18 may take the form of a foam having a dielectric constant of about 1.05 to about 1.15 and a thickness of about 6 mm to about 10 mm. A foam with a higher dielectric constant may be used if any loss due to the higher dielectric constant is acceptable. Such a support may take the form of a low-density polyurethane foam. According to an embodiment, such a support may take the form of a commercially available low density polyurethane foam, such as that sourced from General Plastics Manufacturing Company (Tacoma, Washington).

Thus, the radomes disclosed herein combine the structural strength of a mold injection housing or body 12 with signal transmission properties of a very thin film 16 over the primary radiating region of the antenna. The radomes disclosed herein also provide less RF loss at 28.5 GHz than conventional radomes. The radomes disclosed herein also allow for use of a beamforming antenna that provides better signal transmission and reception than conventional radomes, even at high scan angles. The radomes disclosed herein also provide a physical structure that is resistant to wind deflection.

Figure 3:
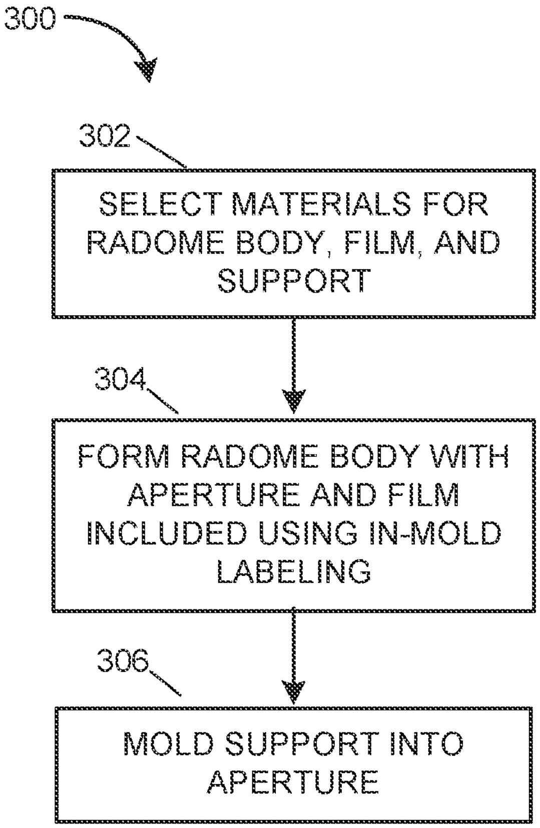
FIG. 3 is a flowchart of a method of manufacture of a mmW radome according to an embodiment of the present invention.

Referring now to FIG. 3, there is shown a flowchart of a method 300 of manufacture of mmW radome 10 according to certain embodiments. Materials are selected at operation 302: a first material for radome body; a second material for the film; and a third material for the support. The second material and the third material may each have a low loss at the desired frequency. The first material may also, if desired, have a low loss at the desired frequency. As noted herein, the materials may be selected based upon, for example, the operating frequency, the desired angles of transmission, acceptable loss, and environmental factors.

At operation 304, radome body 12 is formed with aperture 14 and film 16 included therein by an in-mold labeling process. Film 16 may be placed in a mold form for radome body 12 before or during the molding process for radome body 12. When the mold gives shape to radome body 12, including aperture 14, film 16 is applied to radome body 12. Thus, radome body 12 is formed with film 16 therein/thereon. In certain embodiments, film 16 may thus become an integral part with radome body 12.

At operation 306, support 18 is molded into aperture 14 and to film 16 in a molding subsequent to the molding process of body 12 at operation 304, such as by an injection molding process. This provides for direct fusion of support 18 to film 16. This can also provide for direct fusion or bonding of support 18 to the walls of radome body 12 surrounding aperture 14.

Figure 4:
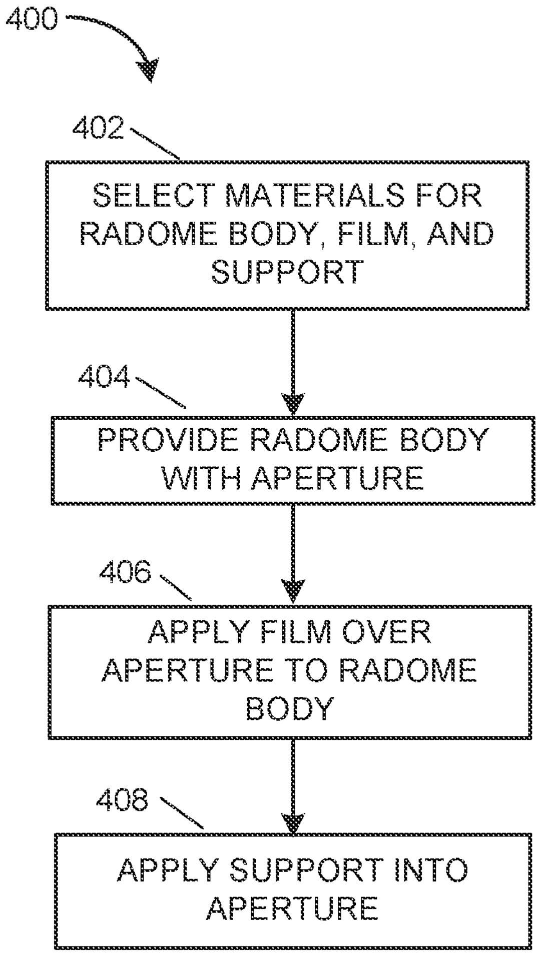
FIG. 4 is a flowchart of a method of manufacture of a mmW radome according to an embodiment of the present invention.

Referring now to FIG. 4, there is shown a flowchart of a method 400 of manufacture of radome 10 according to an embodiment. Materials are selected at operation 402: a first material for radome body 12; a second material for film 16; and a third material for support 18. The second material and the third material may each have a low loss at the desired frequency. The first material may also, if desired, have a low loss at the desired frequency. Radome body 12 with aperture 14 is provided at operation 404. Radome body 12 may be provided by obtaining radome body 12 with aperture 14, obtaining radome body 12 and having aperture 14 cut therein, obtaining radome body 12 and cutting aperture 14 therein, forming radome body 12 with aperture 14 therein, or forming radome body 12 and cutting aperture 14 therein, all by way of non-limiting examples. Radome body 12 may be formed by injection molding or other suitable techniques.

Film 16 is applied over aperture 14 of radome body 12 at operation 406. In certain embodiments, an adhesive may be applied to the outer edges of the inner surface of film 16 and/or to the outer surface of radome body 12 around aperture 14, and then film 16 pressed against radome body 12. In certain embodiments, film 16 may be fastened to body 12 by heat sealing or other suitable coupling techniques.

According to certain embodiments, support 18 may be composed of foam and may be injected at operation 408 into aperture 14 and against film 16. According to certain embodiments support 18 may be composed of foam and may be injected at operation 408 into aperture 14 and against film 16, and substantially seal itself to film 16. According to certain embodiments, support 18 may be composed of foam block which may be inserted at operation 408 into aperture 14 and held in place by a press fit. According to certain embodiments, support 18 may be foam block which may be inserted at operation 408 into aperture 14 and be held in aperture 14 by an adhesive applied to the body in the interior of aperture 14.

Figure 5:
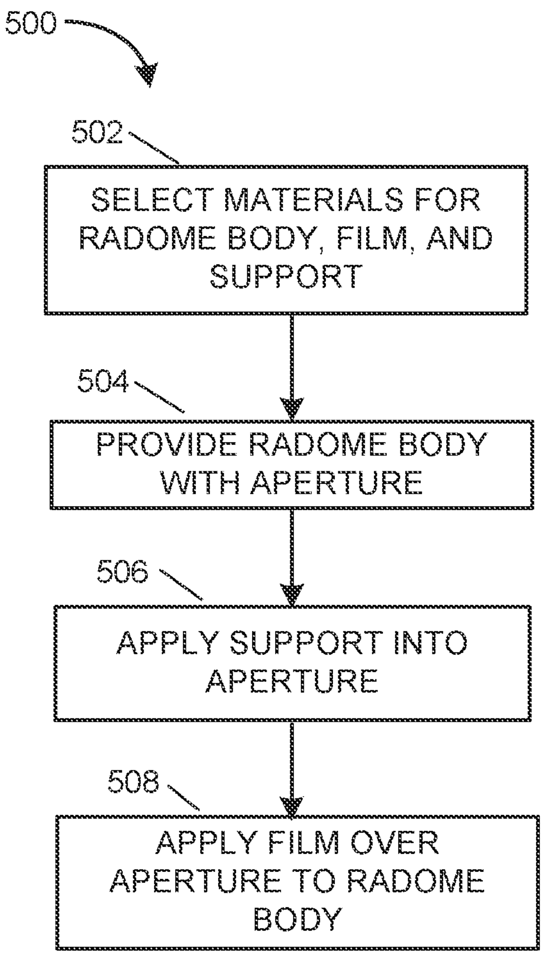
FIG. 5 is a flowchart of a method of manufacture of a mmW radome according to an embodiment of the present invention.

FIG. 5 is a flowchart of a method 500 of manufacture of radome 10. Materials are selected at operation 502: a first material for radome body 12; a second material for film 16; and a third material for support 18. The second material and the third material may each have a low loss at the desired frequency. The first material may also, if desired, have a low loss at the desired frequency. Radome body 12 with aperture 14 is provided at operation 504. Radome body 12 may be provided by obtaining radome body 12 with aperture 14, obtaining radome body 12 and having aperture 14 cut therein, obtaining radome body 12 and cutting aperture 14 therein, forming radome body 12 with aperture 14 therein, or forming radome body 12 and cutting aperture 14 therein, all by way of non-limiting examples. Radome body 12 may be formed by injection molding or other suitable techniques.

According to certain embodiments, support 18 may be applied to aperture 14 at operation 506, and then film 16 applied to both body 12 and support 18 at operation 508. According to certain embodiments, support 18 may be composed of foam and may be injected at operation 506 into aperture 14. According to certain embodiments, support 18 may be composed of foam block which may be inserted at operation 506 into aperture 14 and held in place by a press fit. According to certain embodiments, support 18 may be foam block which may be inserted at operation 506 into aperture 14 and be held in aperture 14 by an adhesive applied to body 12 in the interior of aperture 14.

Film 16 is applied over aperture 14 of radome body 12 at operation 508. In certain embodiments, an adhesive may be applied to the outer edges of the inner surface of the film 16 and/or to the outer surface of the radome body 12 around the aperture 14, and then the film 16 pressed against the radome body 12. In certain embodiments, the film 16 may be fastened to the body 12 by heat sealing or other suitable coupling techniques.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations may be well known in the art, and because they do not facilitate a better understanding of the present disclosure, a discussion of such elements and operations is not provided herein. The present disclosure is deemed to inherently include all such elements, variations, and modifications to the described aspects that would be known to those of ordinary skill in the art, particularly in view of reading the present disclosure.

The terminology used herein is for the purpose of describing particular example embodiments only and is not intended to be limiting. As used herein, the singular forms "a", "an", and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. For brevity and/or clarity, well-known functions or constructions may not be described in detail herein.

The terms "for example" and "such as" mean "by way of example and not of limitation." The subject matter described herein is provided by way of illustration for the purposes of teaching, suggesting, and describing, and not limiting or restricting. Combinations and alternatives to the illustrated embodiments are contemplated, described herein, and set forth in the claims.

For convenience of discussion herein, when there is more than one of a component, that component may be referred to herein either collectively or singularly by the singular reference numeral unless expressly stated otherwise or the context clearly indicates otherwise. For example, components N (plural) or component N (singular) may be used unless a specific component is intended. Also, the singular forms "a," "an," and "the" are intended to include the plural forms as well, unless expressly stated otherwise or the context indicates otherwise.

The terms "includes," "has," "having," or "exhibits," or variations in form thereof are intended to be inclusive in a manner similar to the term "comprises" as that term is interpreted when employed as a transitional word in a claim.

It will be understood that when a component is referred to as being "connected" or "coupled" to another component, it can be directly connected or coupled or coupled by one or more intervening components unless expressly stated otherwise or the context clearly indicates otherwise.

The term "and/or" includes any and all combinations of one or more of the associated listed items. As used herein, phrases such as "between X and Y" and "between about X and Y" should be interpreted to include X and Y unless expressly stated otherwise or the context clearly indicates otherwise.

Terms such as "about", "approximately", "around", and "substantially" are relative terms and indicate that, although two values may not be identical, their difference is such that the apparatus or method still provides the indicated or desired result, or that the operation of a device or method is not adversely affected to the point where it cannot perform its intended purpose. As an example, and not as a limitation, if a height of "approximately X inches" is recited, a lower or higher height is still "approximately X inches" if the desired function can still be performed or the desired result can still be achieved.

While the terms vertical, horizontal, upper, lower, bottom, top, and the like may be used herein, it is to be understood that these terms are used for ease in referencing the drawing and, unless otherwise indicated or required by context, does not denote a required orientation.

The different advantages and benefits disclosed and/or provided by the implementation(s) disclosed herein may be used individually or in combination with one, some or possibly even all of the other benefits. Furthermore, not every implementation, nor every component of an implementation, is necessarily required to obtain, or necessarily required to provide, one or more of the advantages and benefits of the implementation.

Conditional language, such as, among others, "can", "could", "might", or "may", unless specifically stated otherwise, or otherwise understood within the context as used, is generally intended to convey that certain embodiments preferably or optionally include certain features, elements and/or steps, while some other embodiments optionally do not include those certain features, elements and/or steps. Thus, such conditional language indicates, in general, that those features, elements and/or step may not be required for every implementation or embodiment.

The subject matter described herein is provided by way of illustration only and should not be construed as limiting the nature and scope of the claims herein. While different embodiments have been provided above, it is not possible to describe every conceivable combination of components or methodologies for implementing the disclosed subject matter, and one of ordinary skill in the art may recognize that further combinations and permutations that are possible. Furthermore, the nature and scope of the claims is not necessarily limited to implementations that solve any or all disadvantages which may have been noted in any part of this disclosure. Various modifications and changes may be made to the subject matter described herein without following, or departing from the spirit and scope of, the exemplary embodiments and applications illustrated and described herein. Although the subject matter presented herein has been described in language specific to components used therein, it is to be understood that the scope of the claims is not necessarily limited to the specific components or characteristics thereof described herein; rather, the specific components and characteristics thereof are disclosed as example forms of implementing the disclosed subject matter. Accordingly, the disclosed subject matter is intended to embrace all alterations, modifications, and variations, that fall within the scope and spirit of any claims that may be written therefor.

The foregoing Detailed Description is intended only to convey to a person having ordinary skill in the art the fundamental aspects of the disclosed subject matter and is not intended to limit, and should not be construed as limiting, the scope of the claims herein. Further, in the foregoing Detailed Description, various features may be grouped together in a single embodiment for the purpose of streamlining the disclosure. This method of disclosure is not to be interpreted as reflecting an intention that the claimed embodiments require more features than are expressly recited in each claim. Rather, as the following claims reflect, patentable subject matter may lie in less than all features of a single disclosed embodiment. Thus the following claims are hereby incorporated into the Detailed Description, with each claim standing on its own as a separate embodiment.

What is claimed is:

1. A radome comprising:

a radome body having an aperture;

a film covering the aperture, wherein the film exhibits a low loss at a desired frequency; and a support at least partially installed into the aperture and at least partially supporting the film, wherein the support exhibits a low loss at the desired frequency, wherein the film is integrally molded to the radome body.

2. The apparatus of claim 1, wherein the support is a low loss dielectric foam.

3. The apparatus of claim 1, wherein the film extends beyond edges of the aperture.

4. The apparatus of claim 1, wherein the support extends beyond at least one of an inner surface of the radome body or an outer surface of the radome body.

5. The apparatus of claim 1, wherein the film has a thickness of about 100 to about 250 μm.

6. The apparatus of claim 1, wherein the aperture has dimensions of about 101.479 mm by about 124.272 mm.

7. The apparatus of claim 1, wherein the support has a thickness of between 2 to 3 mm.

8. The apparatus of claim 1, wherein the support comprises a low-density rigid polyurethane foam.

9. The apparatus of claim 1, wherein the radome is used with an antenna array having a boresight and the aperture is in the boresight of the antenna array.

10. The apparatus of claim 1, wherein the desired frequency is approximately 28.5 GHz.

11. A method for making a radome, the method comprising:

using an in mold labeling process to manufacture a radome body with an aperture, wherein a film covers the aperture; and providing a support in the aperture, wherein the radome body is comprised of a first material, the film is comprised of a second material, and the support is comprised of a third material.

12. The method of claim 11, wherein the film extends beyond edges of the aperture.

13. The method of claim 11, further comprising a step of manufacturing a radome body with an aperture of 101.479 mm by 124.272 mm to manufacture the radome body with the aperture.

14. The method of claim 11, wherein the aperture, the film, and the support provide a low loss boresight.

15. The method of claim 11, wherein the film and the support each have a low loss at a desired frequency.

16. The method of claim 11, wherein the film is integrally molded to the radome body.

17. The method of claim 11, wherein the third material is a low loss dielectric foam.

18. A method for making a radome, the method comprising:

providing a radome body having an aperture formed therein;

providing a film over the aperture, wherein the film exhibits a low loss at a desired frequency, and wherein the film extends beyond edges of the aperture; and installing a support at least partially into the aperture, wherein the support exhibits a low loss at the desired frequency, and wherein the radome body is comprised of a first material, the film is comprised of a second material, and the support is comprised of a third material.

19. The method of claim 18, wherein installing a support into the aperture comprises injecting a low-density rigid polyurethane foam into the aperture.

* * * * *